May 15, 1934.  H. J. GOSS  1,959,235
MACHINE FOR MAKING BOXES
Filed Oct. 11, 1933  5 Sheets-Sheet 1

INVENTOR.
HAROLD J. GOSS.
BY
ATTORNEY.

May 15, 1934.  H. J. GOSS  1,959,235
MACHINE FOR MAKING BOXES
Filed Oct. 11, 1933  5 Sheets-Sheet 2

INVENTOR.
HAROLD J. GOSS.
BY
ATTORNEY.

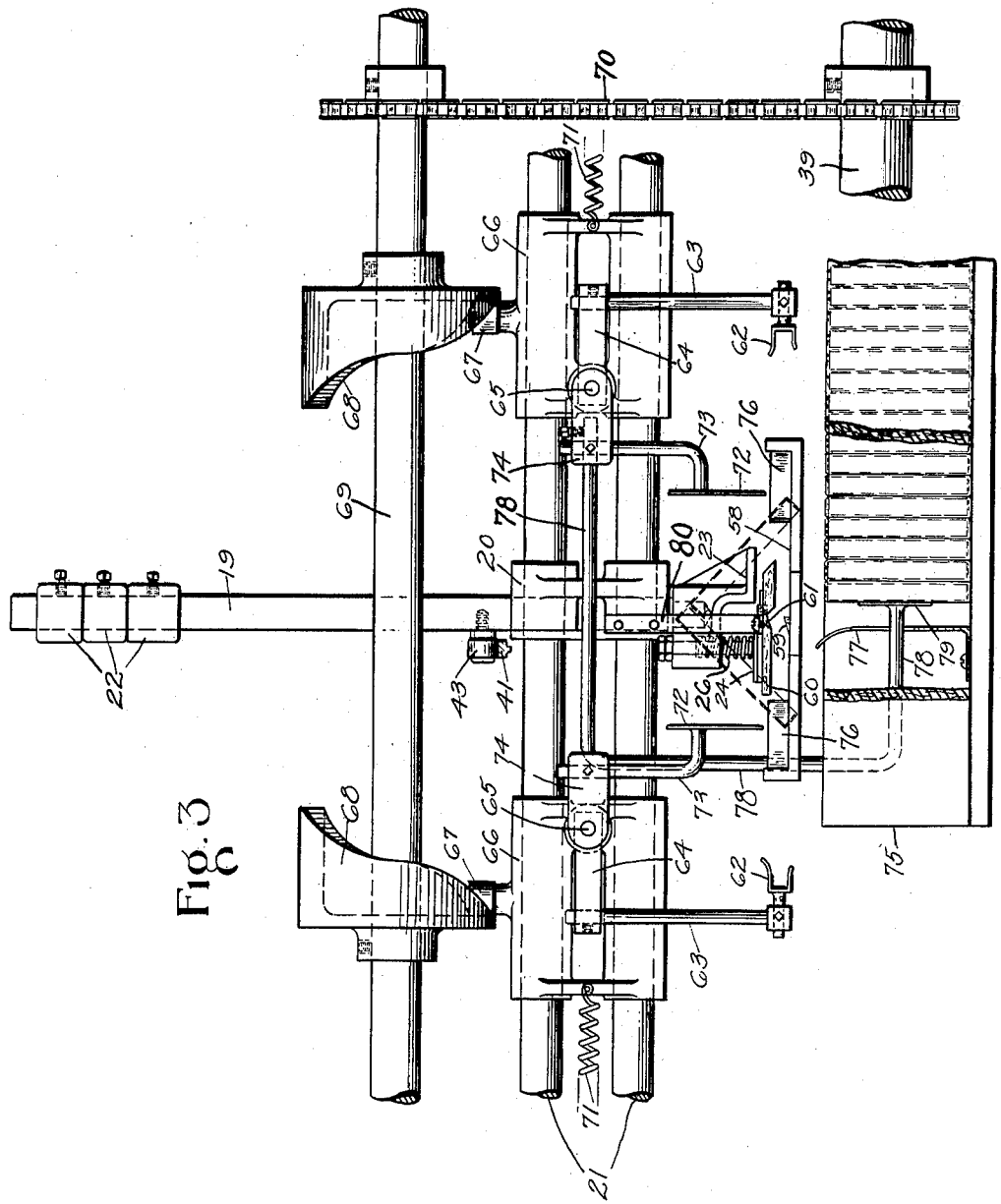

May 15, 1934.   H. J. GOSS   1,959,235
MACHINE FOR MAKING BOXES
Filed Oct. 11, 1933   5 Sheets-Sheet 4
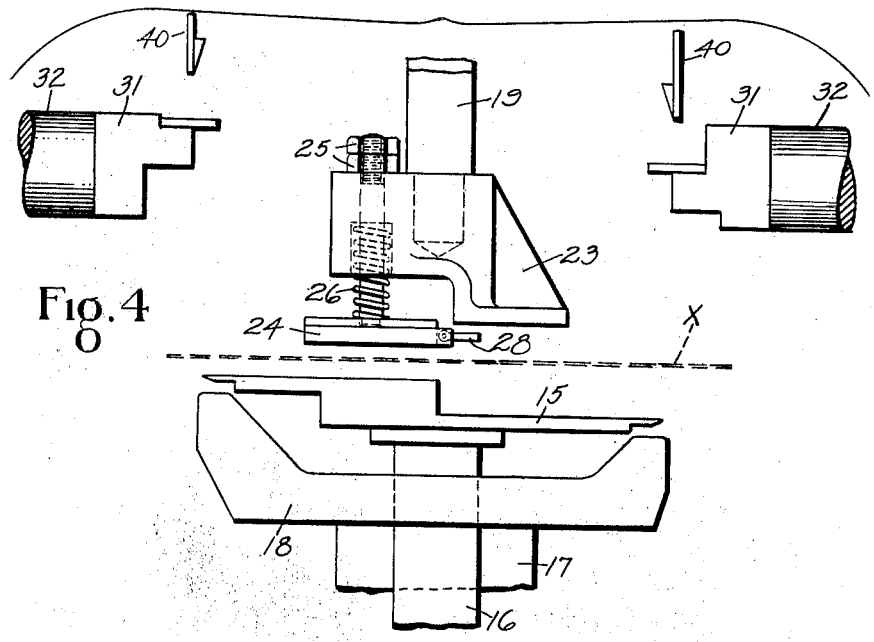
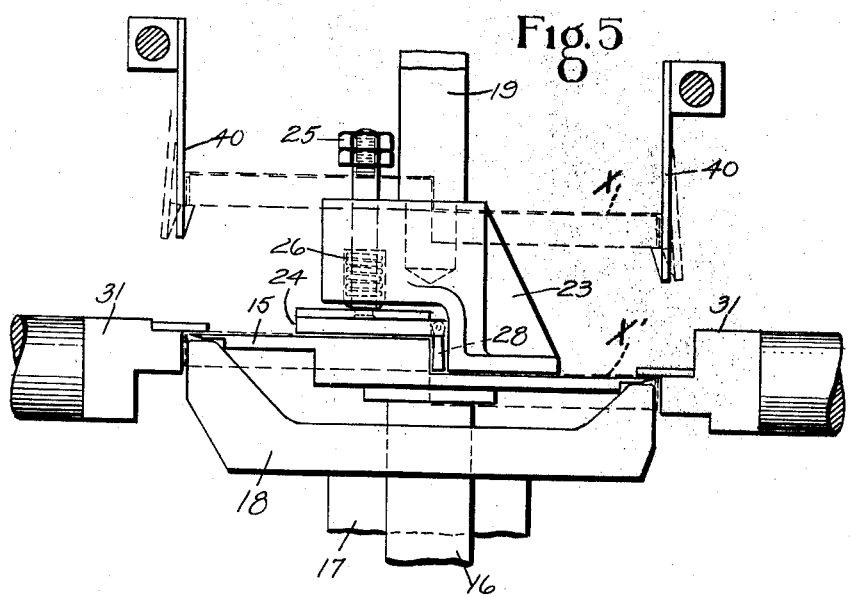
INVENTOR.
HAROLD J GOSS
BY
ATTORNEY.

May 15, 1934.  H. J. GOSS  1,959,235
MACHINE FOR MAKING BOXES
Filed Oct. 11, 1933  5 Sheets-Sheet 5

INVENTOR.
HAROLD J. GOSS.
BY *A.H. Harrison*
ATTORNEY.

Patented May 15, 1934

1,959,235

UNITED STATES PATENT OFFICE 1,959,235

MACHINE FOR MAKING BOXES

Harold J. Goss, Nashua, N. H., assignor to The International Paper Box Machine Company, Nashua, N. H., a corporation of Maine Application October 11, 1933, Serial No. 693,205

17 Claims. (Cl. 93—49)

The invention relates to the manufacture of so-called paper boxes, that is, boxes made of paper material or card board, and has particular reference to the production of complete boxes, each comprising a single blank or piece of material and including both the bottom and lid members both of which have wall sections.

Attempts have been made to produce machines for making such boxes, but so far as I am aware, none have been commercially successful unless a part of the work is effected manually or by a separate machine; and of course speed of production is not high when part of the work requires hand labor.

One of the objects of my invention is to provide an improved machine capable of automatically converting blanks, each of which includes all of the sections required to furnish the bottom and lid and the wall members of both, to a complete set up condition, ready to receive goods.

Another object is to provide such a machine which will deliver such complete boxes with the lid and bottom members closed together so they may be stored or shipped elsewhere to be opened and filled with goods.

With said objects in view, and others hereinafter referred to, the invention consists in the construction and combination of parts substantially as hereinafter described and claimed.

Of the accompanying drawings:

Figure 3 is an elevation looking from the left of Figure 1.

Figures 4 and 5 are detail sectional views on line 4—5 of Figure 2, illustrating the compound plungers and the pressers which cooperate therewith, in different positions of operation.

Similar reference characters designate similar parts or features in all of the figures.

As the present invention is of the same general type as that illustrated in reissued Letters Patent No. 16,193 dated October 27, 1925, the accompanying drawings do not illustrate the complete machine but only those parts or members which are different from the machine of said patent in order to effect the improved operations which will be described.

Figure 6:
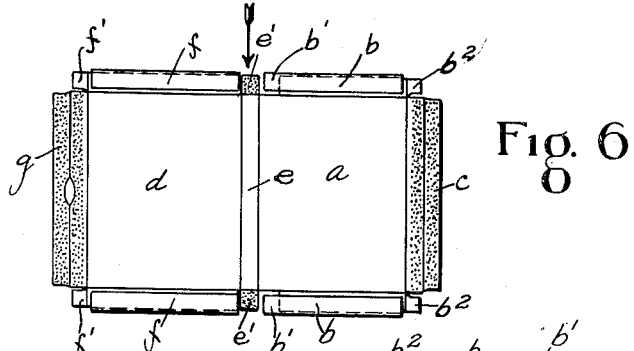
Figures 6, 7, 8, 9 and 10 are views of a blank and box in successive conditions effected by the machine.

The blanks, in such condition as illustrated by Figure 6, are supplied by feeding mechanism similar to that illustrated in the Letters Patent referred to, the blanks being brought toward the position to be operated upon by the mechanism including my present improvements by chains 12 (Fig. 2) provided with pins 13.

Reciprocatory rods 14 similar to the pushers of the patent referred to, deliver each blank to position over a plunger 15 having a stem 16 vertically reciprocable in the stem 17 of the lower plunger 18.

The two plungers are operated by mechanism practically the same as the plunger operating mechanism of the patent referred to.

The upper plunger 15, instead of being horizontally flat as in the patent referred to, is in the form of a step (Fig. 4) in that practically one half of its upper surface is in a plane higher than the other half of said upper surface. The reason for this will be explained hereinafter. Co-acting with the plungers described is an upper presser, the stem 19 of which is vertically slidable in the guide block 20 mounted on two tie rods 21 extending from side to side of the machine.

Mounted on the upper end of the stem 19 are one or more weights 22 by means of which the amount of pressure imparted to the work being performed as hereinafter described may be varied according to the needs of the material of the boxes. In order that the upper presser may properly cooperate with the plungers below it, the lower end of the stem 19 has secured thereto a block 23 (Figs. 3, 4 and 5), the under lower face of which is to co-act with the lower plane surface of the plunger 15 (Fig. 5). Yieldingly mounted in the block 23 is a presser member 24 the stem of which is adjustably held by nuts 25 to maintain the lower face of the member 24 in the proper vertical relationship to the lower face of the block 23. A spring 26 causes the presser 24 to bear yieldingly upon that portion of the blank which extends over the higher plane surface of the plunger 15.

Figure 2:
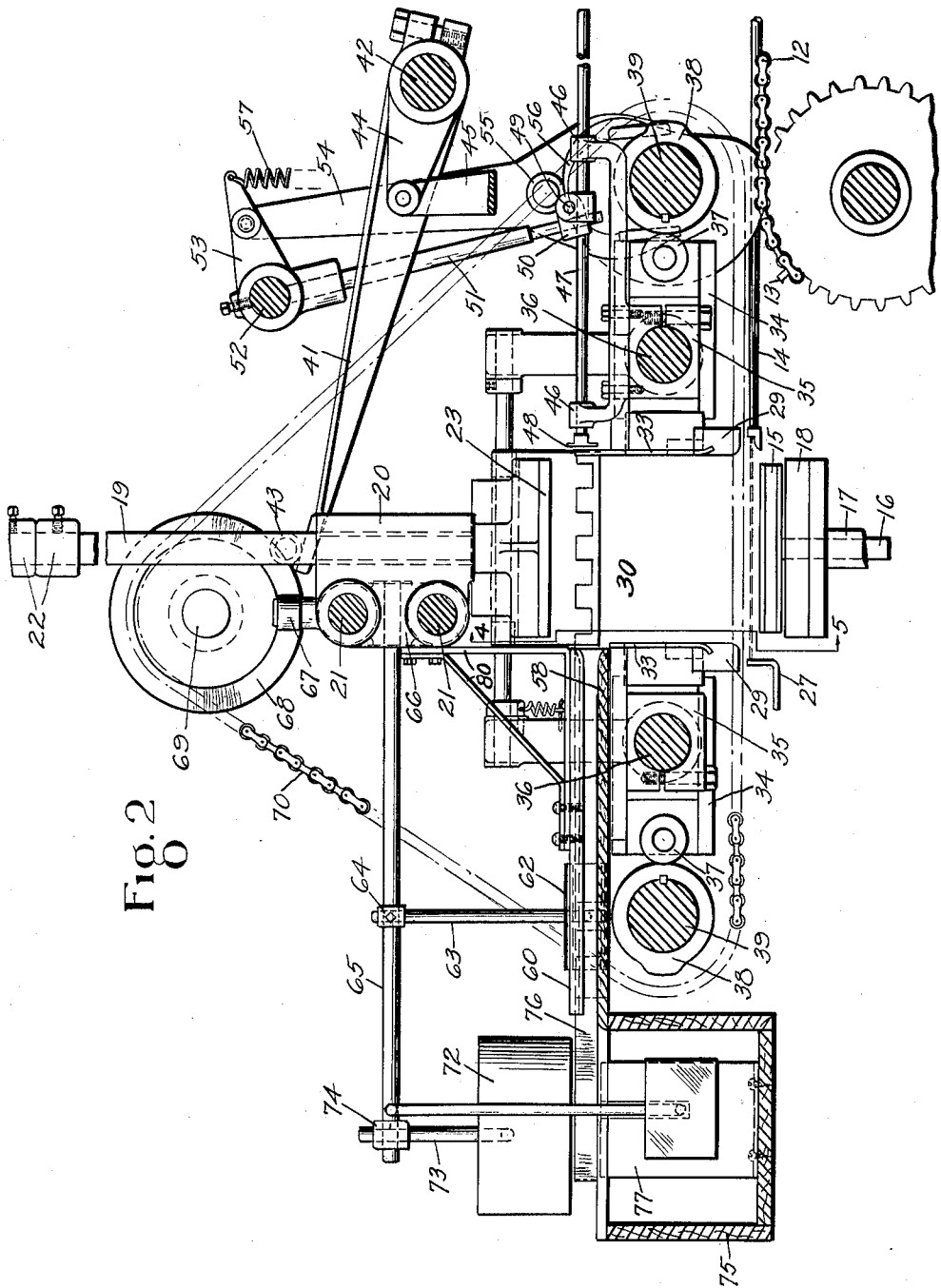
Figure 2 represents a section on line 2—2 of Figure 1.

It is to be understood that each blank such as shown in Figure 6, while being advanced by the chains 12 and their pins 13, in a direction indicated by the arrow shown in Figure 6, to position to be inserted in the folding setting up mechanism by the pushers 14, has glue applied to the areas $c\ g\ e'$. This is effected by suitable glue applying mechanism not necessary to illustrate herein. Said gluing mechanism, in practice, has three glue-applying members the middle one of which applies spots of glue to the areas $e'$ and the other two apply glue to the marginal foldable areas $c\ g$ of the blank. Each blank, carrying the glue as described, is advanced by the pushers 14 against a suitably mounted stop 27 (Fig. 2). It is then in the position indicated by the dash line $x$ in Figure 4.

After the blank arrives in the position described, the plunger 15, rises and carries the blank up with it against the presser members 23, 24 in such a manner that the parts of the blank are folded towards the condition illustrated by the lower dash line $x'$ in Figure 5 although at this time the lower plunger 18 has not yet risen.

In order to bend or deflect the mid-length wall portion $e$ of the blank properly to position and shape during the movements described, one side of the presser member 24 has yieldingly hinged thereto a wing 28. When the plunger 15 rises as described, the wing 28 of the presser member 24 is swung down by contact with the angular corner portion of the block 23 as illustrated by comparing Figures 4 and 5, and such swinging down of the wing 28 converts the blank from flat condition to the bent condition illustrated in Figure 7.

Figure 7:
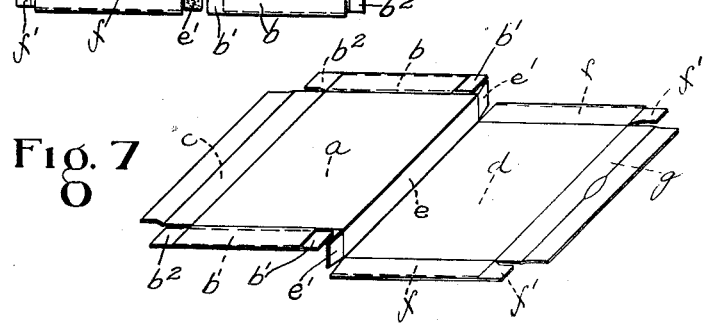

The plunger 18 follows the plunger 15 in an upward movement in a manner similar to the plunger of the patent hereinbefore referred to, but the plunger 15 first arrives in the position indicated in Figure 5, converting the blank to the form shown in Figure 7, and tuckers similar to those illustrated in the patent hereinbefore referred to, push in the outer panels of the wall sections $c$ and $g$. Then the plunger 18 rises to the position shown in Figure 5 and pushes said panels into the box, the end of the upward movement bringing the partially folded blank between the two side pressers which will now be described. Each of these pressers consists of a block 31 (Figs. 4 and 5) mounted on the inner end of a reciprocatory rod 32. The two rods and the pressers 31 are operated by mechanism similar to that illustrated in my reissued Letters Patent No. 16,193 dated October 27, 1925, and therefore needing no detailed explanation herein.

In the present improved machine one of the pressers 31 is higher than the other as shown in Figures 4 and 5, corresponding with the difference of elevation of the two upper plane surfaces of the plunger 15. This, in order that when the upwardly moving plungers have reached the positions illustrated in Figure 5, the blank will be in the condition illustrated in Figure 9, with the portions $c$ $g$ completely folded, and with the adhesive-carrying tabs $e'$ (Figs. 7 and 8) folded in against the outer surface of the tabs $b'$. All of these side or marginal portions are acted upon by side pressers 33 (Fig. 2) carried by carriages 34 mounted to slide on blocks 35 which are mounted on tie rods 36. Each carriage has a roll 37 acted upon by a cam 38 carried by a shaft 39. The two shafts are driven by suitable chain and other gearing not necessary to illustrate.

After each blank has been acted upon to complete the folding of all of its marginal portions, and the side pressers have all been retracted, the compound plungers move to a higher elevation so as to leave the folded blank in the position indicated by the upper dash lines $x$ in Figure 5, where it is caught between two strippers 40, and where it remains temporarily as the plungers again descend for the next operation.

When the folded blank reaches said position, it is essential that the upper presser members carried by the stem 19 shall be lifted somewhat higher. Such lifting is effected by a lever 41 (Fig. 2) carried by a rock shaft 42, said lever 41 extending under a roll 43 mounted on a pin projecting from the stem 19. The rock shaft 42 has a short arm 44 to which is connected a link 45 that is operated by a suitable cam carried by one of the shafts 39. A portion of the link 45 is broken away in Figure 2 to avoid confusion with the illustration of the other parts presently described. After positively lifting the upper presser as described, the lever 41, in its downward movement, swings considerably lower than illustrated in Figure 2 in order to part from the roll 43 and permit the weighted presser to freely descend to perform its described functions.

To eject each folded box from its position held by the strippers 40, I employ a pushing or ejecting mechanism which will now be described.

Mounted to reciprocate in guides 46 (Fig. 2) are two rods 47 each having a pusher 48 at its front end. The two rods 47 are connected by a cross rod or pin 49 on which is mounted a small block 50 which is apertured to slidingly receive the lower end of an arm 51 of a rock shaft 52 suitably mounted in the frame of the machine and having a short arm 53 connected to a link 54 which is suitably guided vertically and has a roll 55 acted upon by a cam 56 carried by the shaft 39. The cam 56 acts to retract the rods 47 having pushing ends 48, and a spring 57 acts on the arm 53 to cause the pushing rods to act yieldingly on each folded blank and eject it onto a shelf 58 suitably supported on one of the tie rods 36.

Figure 8:
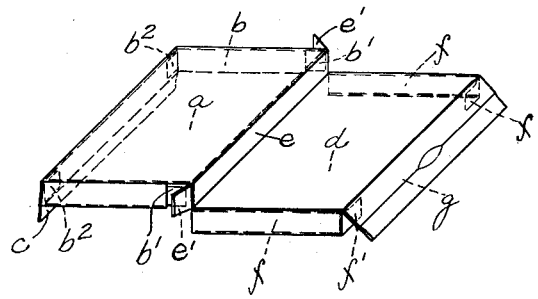
Figure 9:
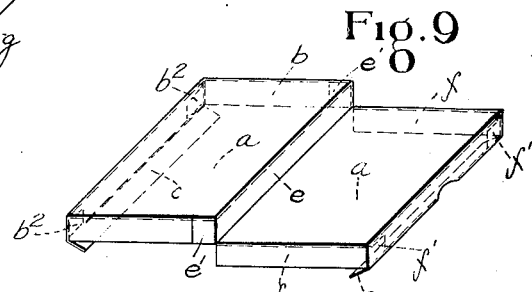
Figure 10:
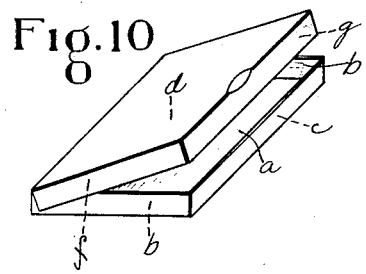

Each blank arrives on the shelf 58 in substantially the condition illustrated by Figures 7, 8 and 9, but with all of the members of the box completely folded and adhesively secured. It is now essential to convert the complete box from its open condition to closed condition ready for delivery from the machine.

The shelf 58 (Fig. 3) is provided with a rib 59 at about its mid-width, one side being substantially vertical and its upper surface inclined or bevelled, and above said shelf and parallel therewith (Fig. 2) is a guide plate 60 the under surface of which (Fig. 3) has a recess 61 corresponding with the rib 59 in shape.

The character of the material employed for the boxes is such that when they are delivered onto the shelf 58 they have a natural tendency to spring up. Excessive springing up is prevented by the guide plate 60. When each blank is pushed onto the shelf 58 its wall section $e$ is guided along the vertical side or face of the rib 59.

Each box that has been operated upon as so far described, is moved by the pushers 47, 48, only far enough to get it out of the way for the next box to be operated upon by the plungers and pressers. In other words it stops temporarily on that portion of the shelf 58 near the plungers until the next box moved by the pushers 47, 48, pushes it toward the delivery end of the shelf.

When each box makes its second stop after having been pushed along on the shelf by the one which is leaving the plunger mechanism, its ends are acted upon by two horizontal trough-shaped pressers 62 (Figs. 1 and 3) carried by rods 63 which depend from and are carried by arms 64 of rods 65. Each rod 65 projects from a slide 66 mounted on the tie rods 21. Each slide 66 has a roll 67 acted upon by a cam 68 carried by shaft 69 which is suitably driven, as by a chain 70, from the shaft 39.

The two slides 66 and the parts carried thereby are operated toward each other simultaneously by the two cams 68, suitable springs 71 (Fig. 3) being employed to effect the return or outward movement of the slides and the parts carried thereby. The reason for the mechanism just described is that the character of the material from which the boxes are made is such that there is a tendency for the walls or margins thereof which have been folded, to spring outwardly, and this mechanism completes the breaking down of the blank on their crease lines. The action of the trough-shaped pressure 62 is to bend the end wall folded portions of the box inwardly while the upper guide plate 60 holds the box and prevents it from being sprung upwardly excessively by the pressure exerted by the members 62. After each box has been acted upon as described, the movement of the next box being pushed along over the shelf 58 delivers the one that has had its ends acted upon by the pressers 62 onto the delivery or outer end of the shelf. Said outer end of the shelf has an opening or is cut away at its middle to permit the box to be folded up and deposited through said opening into a delivery trough. The guide plate 60 is not as long as the shelf under it and therefore when a box arrives over the slotted portion of the shelf, it is beyond the end of said guide plate and therefore free to spring up at its middle toward a complete closed condition, as indicated by the dash lines in Figure 3.

To close each box so that it can pass into the trough 75 presently described, I employ two flat wings 72 (Figs. 1 and 3) each having a stem 73 secured to and depending from a block 74. The two blocks 74 are secured to the ends of the two rods 65 and consequently the said rods are shifted toward and from each other by the cams 68 and the spring cooperating therewith. The two wings 72 as they move towards each other close the box so that it can then drop through the opening in the shelf 58 into a trough 75.

Figure 1:
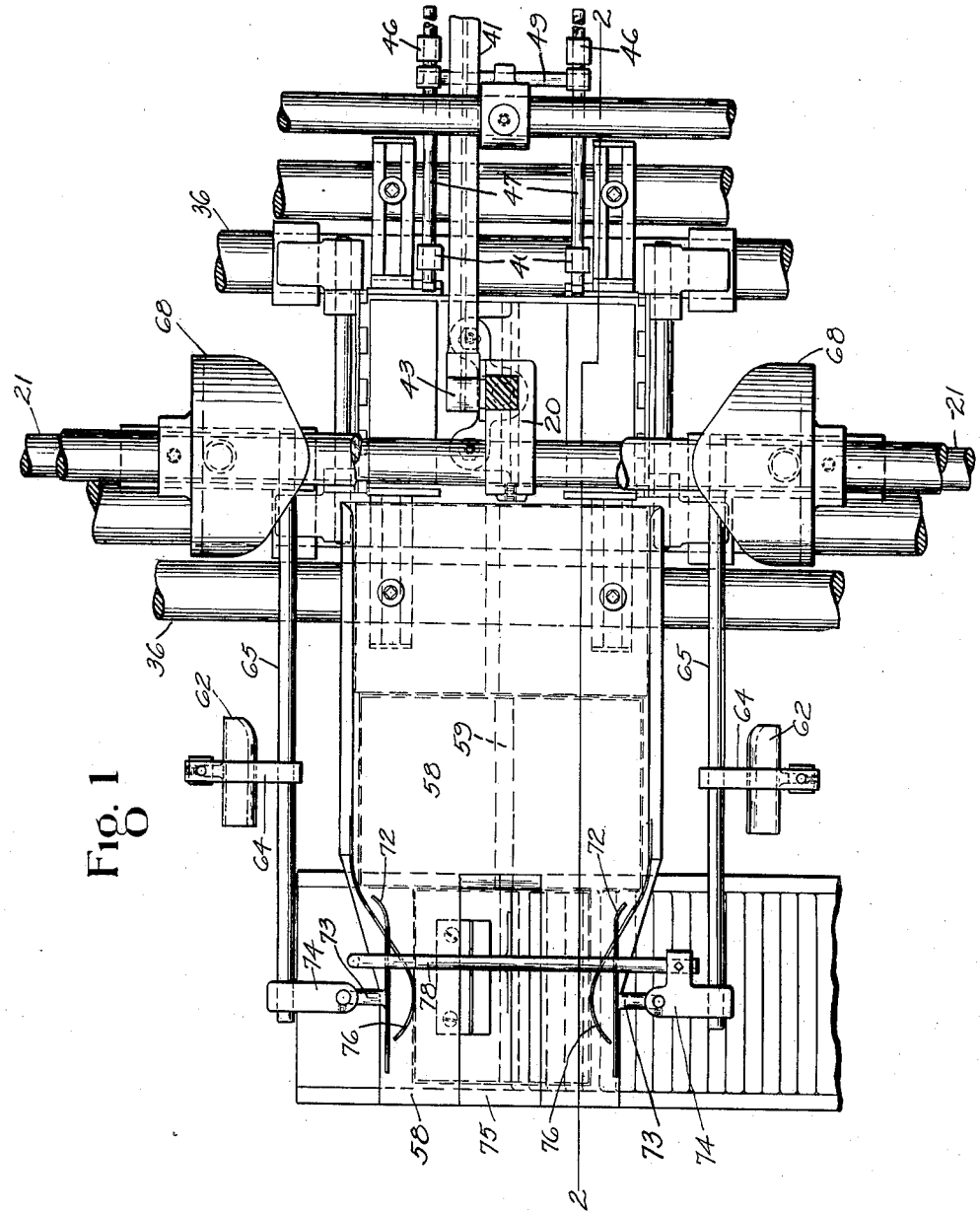
Figure 1 is a plan view of so much of the machine as is necessary for an understanding of the invention, the frame of the machine being omitted for the sake of clearness of illustration.

To aid in bringing the box to a condition to be acted upon by the wings 72, I provide thin plate spring 76 (Figs. 1 and 3) which are secured to the sides of the shelf and extend to position so that each box that is being pushed toward the outer end of the shelf will pass between the free ends of said plate springs, thus causing the box to somewhat rise in the middle, at the hinged point thereof toward the position indicated by dash lines in Figure 3. Each box passes down through the opening in the shelf, and drops into the trough 75 adjacent to a fixed upright wall member 77. Said wall member 77 has an opening through which extends the stem 78 of a pusher 79 which effects the pushing along of an assembly of completed boxes through the trough 75 from which the boxes may be delivered into any suitable receptacle. The stem 78, (Fig. 3) has a lower horizontal portion, a vertical portion, and a horizontal upper portion, the latter of which is connected to one of the blocks 74 as best shown in Figure 1.

The guide plate 60 is illustrated (Figs. 2 and 3) as supported by a somewhat triangular bracket 80 secured to and depending from the guide block 20 mounted on the tie rods 21.

The operation of the machine as a whole will now be described.

It being understood that blanks such as shown in Figure 6 are fed from a pile singly and successively by mechanism such as illustrated and described in Letters Patent No. 1,563,184 hereinbefore referred to, each such blank arrives over the plunger 15 and is arrested by the stop 27 (Fig. 2). Then the plunger 15 rises and, owing to its having its upper surface in two planes, it coacts with the two presser members 23, 24, (Figs. 4 and 5) in converting the blank to the condition shown in Figure 7, with the section $e$, which is to constitute the rear wall of the box broken on the crease lines which connect it with the bottom section $a$ and lid section $d$ of the blank or box.

Owing to the removable and replaceable weights 22 carried by the stem 19 of the compound presser (Fig. 3), the degree of pressure can be varied according to what best suits the kind of material of which the blanks are made. When the presser members 23, 24, descend, the corner of the block 23 acts on the wing 28 and swings it down (Figs. 4 and 5) so that it acts on the section $e$ of the blank to bend it to vertical condition without causing such tearing effect on said section $e$ as would be caused by the corner of the block 23 if the wing 28 was not present.

During the rise of the compound plungers 15, 18, from their lower position illustrated in Figure 2, to carry the partly formed blank up to the plane of operation of the pushers 47, 48, the marginal portions of the sections $a$ and $d$ are converted from their out-standing conditions illustrated in Figure 7, to successively, the folded conditions illustrated by Figures 8 and 9, with the edge portions of the members $c$ and $g$ completely folded inside. In other words, during said rise of the plungers, the side wall sections $b$ $b$ of the section $a$ are bent down, the side wall section $f$ $f$ of the section $d$ are bent down, and the front wall sections $c$ and $g$ are bent down and completely folded, all with the corner flaps $b'$ $b^2$, $e'$ and $f'$ over-laid as illustrated by comparing Figures 6 to 10 inclusive. This particular kind of box forms no part of my invention, and since the various details of the machine which effect the folding of the marginal portions of the box are similar to the marginal folding elements of the patent hereinbefore referred to, and are not claimed herein, detail illustration of said marginal folding elements are unnecessary herein.

After each box is converted to the condition illustrated in Figure 9 (but, of course, with the edges of the sections $e$ and $g$ folded inside), said box is slid by the pushers 47, 48, under the plate 60 and onto the shelf 58 (Figs. 2 and 3), where it remains until pushed further along by the action of another box that is being acted on by the pushers 48. When it arrives as its second stop, it is still between the shelf 58 and the plate 60 and then the trough pressers 62 (Figs. 2 and 3) move in toward each other and act on the adhesive-carrying folded sections $c$ $g$ to ensure, by the pressure exerted by said members 62, the permanent adhesion of the folded sections $c$ $g$.

The box so acted upon is then given a third impulse over the shelf and beyond the end of the plate 60, by the action of the pushers 48 transmitted through the two previously acted upon boxes. During said third movement, the box arrives and passes between the two springs 76 which yieldingly tend to collapse the box toward a closed condition. Such partially collapsed condition is illustrated by dash lines in Figure 3. In such condition the box arrives, at the end of its third movement, between the wings 72 which then approach each other and close the box so that it can drop through the opening in the end of the shelf 58 and into the trough 75 in front of the fixed wall 77. At this time, the pusher 79 is close to the wall 77 so that the closed box drops in front of it, and when said pusher 79 then moves away from the wall 77, the deposited closed box is added to the previously deposited boxes.

The receiving trough 75 aids in ensuring the delivery of the closed boxes in permanently set up condition, for the following reasons:—

As illustrated in Figure 6, the wall tabs $e'$ carry adhesive. These tabs overlie the end tabs $b'$ of the side wall sections $b$. Since the completed boxes are deposited in the trough 75 with their side wall sections in close contact with the side walls of the trough, and slide along and are in contact with said trough walls for a considerable time, the overlying tabs e" b" are maintained in contact for an ample length of time to ensure permanency of the adhesion of said tabs together.

Having now described my invention, I claim:

1. In a machine of the character described, means for converting blanks from flat condition to a form having portions thereof in different planes, said means comprising coacting pressing members having their acting faces permanently in step form.

2. In a machine of the character described, oppositely movable pressing members having their acting faces in different substantially parallel planes, and means for delivering flat blanks to position between said members.

3. In a machine of the character described, a plunger having its upper surface permanently in the form of a step, and pressing members above said plunger, one of said pressing members having its lower surface in a lower plane than the other pressing member.

4. In a machine of the character described, a plunger having its upper surface permanently in the form of a step, vertically movable pressers above said plunger, and a plurality of weights removably connected with said pressers.

5. In a machine of the character described, a plunger having its upper surface permanently in the form of a step, and a pair of vertically movable pressing members above said plunger, one of said pressing members being mounted to yield relatively to the other pressing member.

6. In a machine of the character described, a plunger having its upper surface permanently in the form of a step, a pair of vertically movable pressing members above said plunger, one of said pressing members being mounted to yield relatively to the other pressing member, and a wing pivotally connected to the side of the yieldable pressing member adjacent to the other pressing member.

7. In a machine of the character described, oppositely movable pressing members each having acting faces permanently in different planes, means for delivering flat blanks to position between said members, and side pressers mounted to move in different planes corresponding with the different planes of the first-mentioned pressing members.

8. In a machine of the character described, a vertically movable plunger presenting an upper surface permanently in two planes, vertically movable pressing members above said plunger, and means for raising and lowering said pressing members, said means permitting free movement of the pressing members during the latter part of their descent.

9. In a machine having means for converting a blank to the form of a box, comprising bottom and lid sections hingedly united, a shelf having a rib at its midwidth, a guide plate above the shelf and having a recess corresponding with the rib of the shelf, means for transferring the boxes completed and in open condition along the space between the ribbed shelf and recessed guide plate, and means for closing the boxes and delivering them.

10. In a machine having means for converting a blank to the form of a box comprising bottom and lid sections hingedly united, a shelf, means for transferring the boxes completed and in open condition onto said shelf, and a pair of inwardly movable pressers in position to act on wall portions of each box while on said shelf.

11. In a machine having means for converting a blank to the form of a box comprising bottom and lid sections hingedly united, a shelf, means for transferring the boxes completed and in open condition onto said shelf, and a pair of inwardly movable pressers in position to act on wall portions of each box while on said shelf, the shelf being of such length and the inwardly movable pressers in such location that each box reaching said pressers is advanced to position by the movement of a box behind it.

12. In a machine having means for converting a blank to the form of a box comprising bottom and lid sections hingedly united, a shelf, a guide plate above said shelf, means for transferring the boxes completed and in open condition along the space between said shelf and guide plate, and a pair of inwardly movable pressers in position to act on wall portions of each box while between said shelf and guide plate.

13. In a machine having means for converting a blank to the form of a box comprising bottom and lid sections hingedly united, a shelf extending therefrom and having an opening at the midwidth of its end, a trough below said opening, means for causing the boxes to pass along said shelf in open condition, and means for collapsing the boxes to permit them to pass through said opening into the trough.

14. In a machine having means for converting a blank to the form of a box comprising bottom and lid sections hingedly united, a shelf extending therefrom and having an opening at the midwidth of its end, a trough below said opening, means for causing the boxes to pass along said shelf in open condition, and a pair of inwardly movable wings in position to act on the boxes and collapse them when they arrive over said opening.

15. In a machine having means for converting a blank to the form of a box comprising bottom and lid sections hingedly united, a shelf, means for transferring the boxes completed and in open condition onto said shelf, and means for closing the boxes and delivering them from said shelf, said closing means including plate springs at the sides of the trough.

16. In a machine having means for converting a blank to the form of a box comprising bottom and lid sections hingedly united, a shelf extending therefrom and having an opening at its end, means for causing the boxes to pass along said shelf in open condition, means for collapsing the boxes to permit them to pass through said opening, a trough below said shelf opening, said trough containing an upright wall member, and means for pushing the collapsed boxes away from said wall member.

17. In a machine having means for converting a blank to the form of a box comprising bottom and lid sections hingedly united, a shelf extending therefrom and having an opening at its end, means for causing the boxes to pass along said shelf in open condition, means for collapsing the boxes to permit them to pass through said opening, a trough below said shelf opening, said trough containing an upright wall member having an opening, and a pusher in the trough, said pusher having an operating connection extending through the opening in said wall member.

HAROLD J. GOSS.